(12) United States Patent
Macek et al.

(10) Patent No.: US 10,544,951 B2
(45) Date of Patent: Jan. 28, 2020

(54) OPTIMIZED PRECOOLING OF STRUCTURES

(71) Applicant: Honeywell International Inc., Morris Plains, NJ (US)

(72) Inventors: Karel Macek, Prague (CZ); Karel Marik, Revnice (CZ); Joseph Steven Majewski, Strongsville, OH (US)

(73) Assignee: Honeywell International Inc., Morris Plains, NJ (US)

( * ) Notice: Subject to any disclaimer, the term of this patent is extended or adjusted under 35 U.S.C. 154(b) by 339 days.

(21) Appl. No.: 15/453,630

(22) Filed: Mar. 8, 2017

(65) Prior Publication Data
US 2017/0176036 A1    Jun. 22, 2017

Related U.S. Application Data

(63) Continuation of application No. 14/167,657, filed on Jan. 29, 2014, now Pat. No. 9,625,171.

(51) Int. Cl.
| | | |
|---|---|---|
| *F24F 11/00* | (2018.01) | |
| *G05B 13/02* | (2006.01) | |
| *G05B 19/048* | (2006.01) | |
| *F24F 11/30* | (2018.01) | |
| *F24F 11/62* | (2018.01) | |
| *F24F 130/10* | (2018.01) | |
| *F24F 130/00* | (2018.01) | |
| *F24F 11/63* | (2018.01) | |
| *F24F 11/64* | (2018.01) | |

(52) U.S. Cl.
CPC ............. *F24F 11/30* (2018.01); *F24F 11/62* (2018.01); *G05B 13/026* (2013.01); *G05B 19/048* (2013.01); *F24F 11/63* (2018.01); *F24F 11/64* (2018.01); *F24F 2130/00* (2018.01); *F24F 2130/10* (2018.01); *G05B 2219/2614* (2013.01)

(58) Field of Classification Search
CPC .................................. F24F 11/30; F24F 11/62
See application file for complete search history.

(56) References Cited

U.S. PATENT DOCUMENTS

| | | |
|---|---|---|
| 8,755,943 B2 | 6/2014 | Wenzel |
| 9,235,657 B1 | 1/2016 | Wenzel et al. |
| 2012/0259469 A1 | 10/2012 | Ward et al. |

(Continued)

OTHER PUBLICATIONS

Kelman et al, Bilinear Model Predictive Control of a HVAC System Using Sequential Quardatic Programming, Jan. 2011, pp. 9869-9874. (Year: 2011).*

(Continued)

*Primary Examiner* — Mark A Connolly
(74) *Attorney, Agent, or Firm* — Seager Tufte & Wickhem LLP (57) ABSTRACT

A method includes aggregating multiple zones of an indoor structure, each zone having associated comfort limits, formulating an aggregated single zone model predictive control (MPC) problem representative of the multiple zones for a heating ventilation and air conditioning (HVAC) system, determining optimal aggregated actions as a function of the aggregated single zone model predictive control problem, simulating an optimal trajectory of indoor qualities, and determining zone temperature setpoints to comply with the comfort limits for each zone and pre-cool the indoor structure.

20 Claims, 5 Drawing Sheets

(56) References Cited

U.S. PATENT DOCUMENTS

| | | | |
|---|---|---|---|
| 2013/0013121 A1 | 1/2013 | Henze et al. | |
| 2014/0128997 A1* | 5/2014 | Holub | G05B 13/048 700/30 |
| 2014/0156083 A1 | 6/2014 | Burke | |

OTHER PUBLICATIONS

Kwadzogah et al., Model Predictive Control for HVAC Systems—A Review, 2013, pp. 442-447 (Year: 2013).*

Aswani, A., et al., "Energy-Efficient Building HVAC Control Using Hybrid System LBMPC", arXiv:1204.4717v1 [math.OC], (2012), 1-7.

Gayeski, N. T, et al., "Predictive pre-cooling of thermo-active building systems with low-lift chillers. Part I: control algorithm", [Online]. Retrieved from the Internet: <URL:http://web.mit.edu/parmstr/www/pubs/PredictivePrecoolingControl-pt1.pdf>, (Accessed Jan. 9, 2014), 15 pgs.

Macek, Karel, et al., "Trajectory Optimization under Changing Conditions through Evolutionary Approach and Black-Box Models with Refining", [Online]. Retrieved from the Internet: <URL: http://library.utia.cas.cz/separaty/2013/AS/macektrajectory%20optimization%20under%20changing.pdf>, (Accessed Jan. 9, 2014), 1-8.

Marijt, Robert, "Multi-objective Robust Optimization Algorithms for Improving Energy Consumption and Thermal Comfort of Buildings", Faculty of Computer Science at the University of Leiden, M.Sc. Thesis, (Jul. 2009), 54 pgs.

Sailor, D. J, et al., "Air conditioning market saturation and long-term response of residential cooling energy demand to climate change", Energy, 28(9), (Jul. 2003), 941-951.

Yao, Ye, et al., "Global optimization of a central air-conditioning system using decomposition—coordination method", Energy and Buildings, 42(5), (May 2010), 570-583.

\* cited by examiner

OPTIMIZED PRECOOLING OF STRUCTURES

PRIORITY INFORMATION

This application is a continuation of U.S. application Ser. No. 14/167,657, filed Jan. 29, 2014, the entire specification of which is incorporated herein by reference.

BACKGROUND

It is generally well known that precooling of buildings can lead to significant savings of energy consumption. It is easier to generate the cooling load during the night when the outdoor air is cold. Furthermore, natural ventilation can be used. Additionally, some utility companies offer tariffs with prices varying with the time of day that can make the pre-cooling even more efficient. Of course, the capability of precooling is given also by the properties of building such as its insulation and capacity.

Model predictive control offers a variety of methods to deal with given problem. It consists in determination of actions (intensity of chillers' and fans' operation) so the expected loss is minimal. However, the model typically works with many simplifications. Moreover, the weather forecast is affected by an error, typically non trivial. Thus, blind use of the optimized actions could lead to excesses from the comfort limits. This could have for the customer critical consequences like loss of buyers in the case of retail centers, or tenants in the case of residential buildings.

SUMMARY

A method includes aggregating multiple zones of an indoor structure, each zone having associated own comfort limits, formulating an aggregated single zone model predictive control (MPC) problem representative of the multiple zones for a heating ventilation and air conditioning (HVAC) system, determining optimal aggregated actions as a function of the aggregated single zone model predictive control problem, simulating an optimal trajectory of indoor qualities, and determining zone temperature setpoints to comply with the comfort limits for each zone and pre-cool the indoor structure.

A machine readable storage device having instructions for execution by a processor of the machine to perform aggregating multiple zones of an indoor structure, each zone having associated comfort limits, formulating an aggregated single zone model predictive control (MPC) problem representative of the multiple zones for a heating ventilation and air conditioning (HVAC) system, determining optimal aggregated actions as a function of the aggregated single zone model predictive control problem, simulating an optimal trajectory of indoor qualities, and determining zone temperature setpoints to comply with the comfort limits for each zone and pre-cool the indoor structure.

A device includes a processor and a memory device coupled to the processor and having a program stored thereon for execution by the processor to aggregate multiple zones of an indoor structure, each zone having associated comfort limits, formulate an aggregated single zone model predictive control (MPC) problem representative of the multiple zones for a heating ventilation and air conditioning (HVAC) system, determine optimal aggregated actions as a function of the aggregated single zone model predictive control problem, simulate an optimal trajectory of indoor qualities, and determine zone temperature setpoints to comply with the comfort limits for each zone and pre-cool the indoor structure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

It is generally well known that precooling of buildings can lead to significant savings of energy consumption. It is easier to generate the cooling load during the night when the outdoor air is cold. Furthermore, natural ventilation can be used. Additionally, some utility companies offer tariffs with prices varying with the time of day that can make the pre-cooling even more efficient. Of course, the capability of precooling is given also by the properties of building such as its insulation and capacity.

Model predictive control offers a variety of methods to optimize solutions for various problems. It consists of determining actions (intensity of chillers' and fans' operation, as well as the position of damper valves) to minimize expected loss. A model used in model predictive control typically works with many simplifications. Factors taken into account by such models may include weather conditions, forecasted weather, dynamic energy prices, thermal capacity, building occupancy, and time of day. The weather forecast may be affected by an error, typically non trivial. Thus, blind use of the optimized actions could lead to excesses from the comfort limits. This could have for the customer critical consequences like loss of buyers in the case of retail centers, or tenants in the case of residential buildings.

With respect to pre-cooling of buildings, multiple zones within a building make the optimization problem computationally very complex or even insolvable in a reasonable time.

Various embodiments offer a simple way how to keep an indoor temperature within given limits. In one embodiment, the limits are given for each time instant and might vary over time. An aggregated single-zone MPC problem is formulated in order to avoid complexity of multi-zone modeling and optimization.

Figure 1:
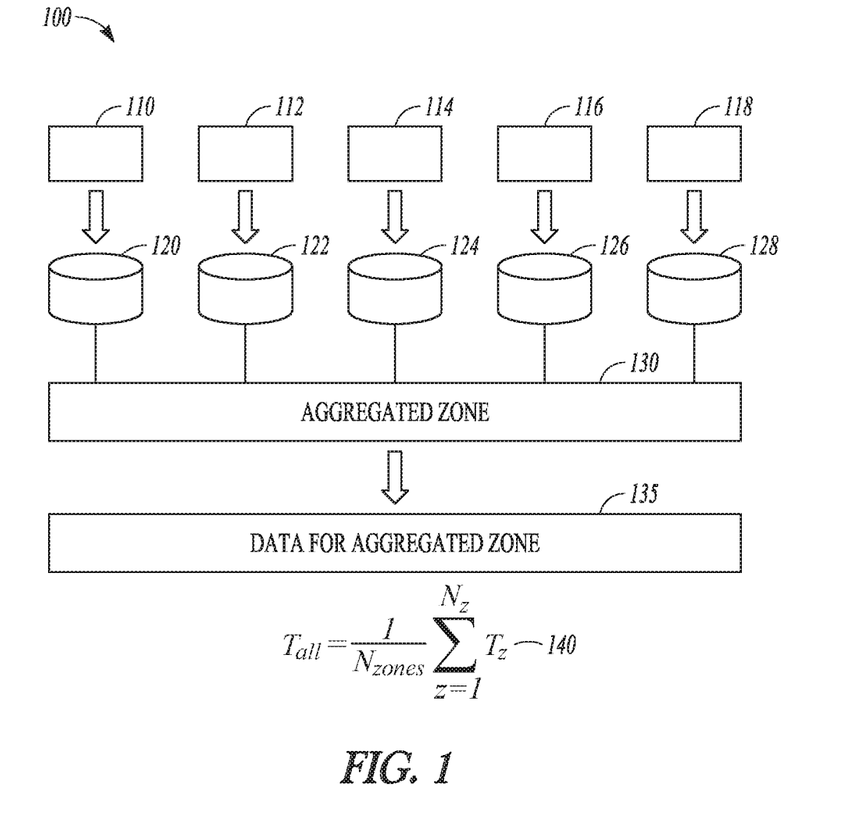
FIG. 1 is a block diagram illustrating a method for aggregating zones according to an example embodiment.

FIG. 1 is a block diagram illustrating a method 100 for aggregating zones. For instance, given five zones 110, 112, 114, 116, and 118 along with data associated with each zone at 120, 122, 124, 126, and 128, an aggregated zone 130 is formed. Data for the aggregated zone is illustrated at 135. In one embodiment, if the zones are practically the same size, their temperatures may be aggregated at 140 using weights 0.2; 0.2; 0.2; 0.2; and 0.2 respectively.

Figure 2:
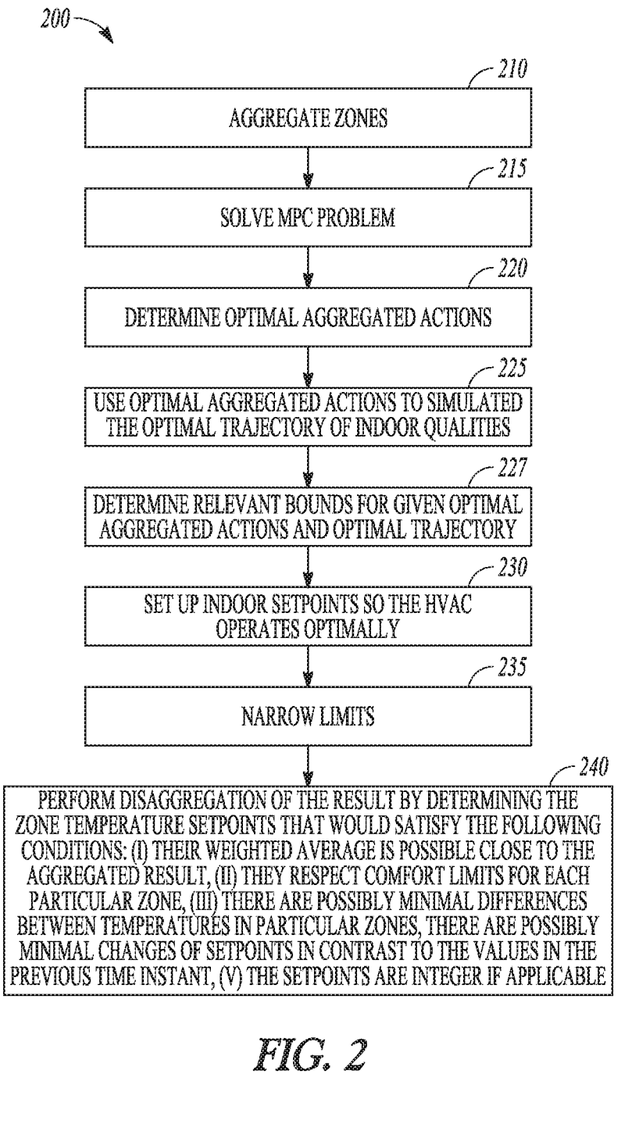
FIG. 2 is flowchart illustrating a method of determining setpoints for precooling of a building according to an example embodiment.

A method 200 of determining setpoints for precooling of a building is illustrated in flowchart form in FIG. 2. Once the zones have been aggregated at 210, the aggregated MPC problem is solved at 215, and optimal aggregated actions are determined at 220. The optimal aggregated actions are used to simulate the optimal trajectory of indoor qualities at 225. Typically, only temperature is used to define indoor qualities, but humidity and air quality may be considered in further embodiments.

Relevant bounds for given optimal aggregated actions and optimal trajectory are then determined at 227. Instead of controlling the HVAC directly, indoor setpoints are set up at 230 so the HVAC operates optimally. For instance, the aggregated decision may be that the chiller is on during the next hour. Based on the simulation of the model, it is learned that the temperature will be 73.14 F. Then the limit may be made narrower at 235—originally it could be from 65 to 75 F, but now the limit may be set from 65 to 73.14. If the result would be based on heating, 73.14 to 75 may be used instead.

The result may then be disaggregated optimally. Disaggregation of the result may be performed by determining the zone temperature setpoints at 240 that would satisfy the following conditions: (i) their weighted average is possibly close to the aggregated result, (ii) they respect comfort limits for each particular zone, (iii) there are possibly minimal differences between temperatures in particular zones, there are possibly minimal changes of setpoints in contrast to the values in the previous time instant, (v) the setpoints are integer if applicable. In the above mentioned example, temperatures 73; 73; 73; and 74 may be obtained, which satisfy all the conditions (i) to (v). The disaggregated limits may be distributed to the lower level controllers at 245 for the next time instant. The lower level controllers can be assumed in some embodiments to solve their single-step ahead optimal control problem for given set-points and pursue the optimality also at this level.

MPC procedure may be implemented by adopting alternative approaches like mixed integer linear programming, quadratic programming, gradient search, evolutionary algorithms or approximate dynamic programming. The nonlinear nature of relationships in the building might lead to slightly different formulation for different building types.

Zone weighting may express each zone's "average" thermal properties. The first attempt is to use the buildings documentation and determine weights for each zone as a function of the area, volume, or other physical properties of the zones. Alternatively, the zone weights can be determined during an identification procedure. The weights are optimal if they lead to an aggregated model with the lowest error. The optimal disaggregation can make use of combination of heuristics and systematic search.

In one embodiment, the MPC problem may be formulated for the next 24 hours by defining several constraints:

$$x_t = f(x_{t-1}, u_{t-1}) \forall t = 2, 3, \ldots t_{max}$$

where $x_t$ is the state of the building including temperatures and humidities and $u_t$ represents inputs from both external sources, such as weather and internal states of equipment such as fans.

$$x_1 = x_{now}$$

where $x_{now}$ is the current best estimate of the state of the building.

$$u\mu_{ext,t} = u_{forcast,t}$$

where $u_{forecast,t}$ represents the best estimate of future external inputs such as third party weather forecasts.

$$x_t \leq x_{max}$$

where $x_t$ is a definition of comfort ranges which might be time dependent.

$$-x_t \leq -x_{min}$$

where $$u_{ctr,t} \leq u_{ctrmax}$$

$$-u_{ctr,t} \leq u_{ctrmin}$$

where uctr,t represents restrictions on controllable inputs which might be time dependent.

An objective function to be minimized accounting for resources consumed by controllable inputs based on recent prices is $$C = \sum_t c'_t g(u_t)$$

The next step to be maintained by the system is defined as $x_2$, where $x_2 = f(x_1, u_1)$ Disaggregation is then performed in accordance with $$\frac{1}{N_z} \sum x_{z,2} = x_2$$

where Nz is the number of zones, $x_z$ is the state of the zones at the next time, and $x_2$ is the next state aggregated.

Figure 3:
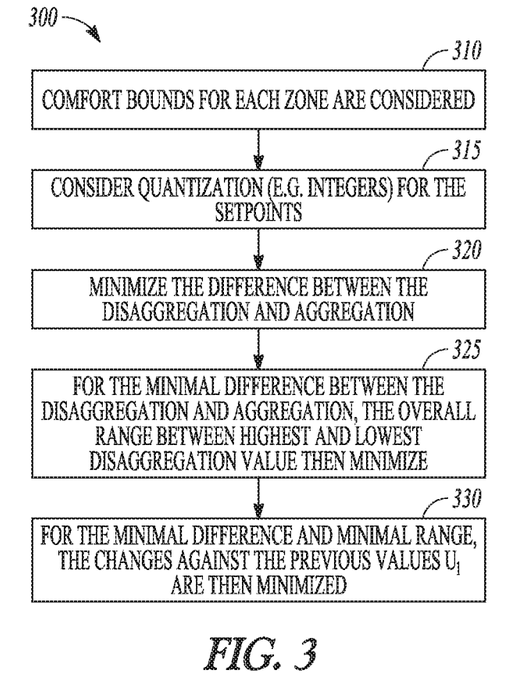
FIG. 3 is flowchart illustrating a method of performing disaggregation of aggregated results for precooling of a building according to an example embodiment.

In one embodiment, disaggregation may be performed in accordance with method 300 illustrated in flowchart form in FIG. 3. At 310, comfort bounds for each zone are considered, along with the quantization (e.g. integers) for the setpoints at 315. At 320, the difference between the disaggregation and aggregation is minimized. For the minimal difference between the disaggregation and aggregation, the overall range between highest and lowest disaggregated value is then minimized at 325. For the minimal difference and minimal range, the changes against the previous values $u_1$ are then minimized at 330.

Figure 4:
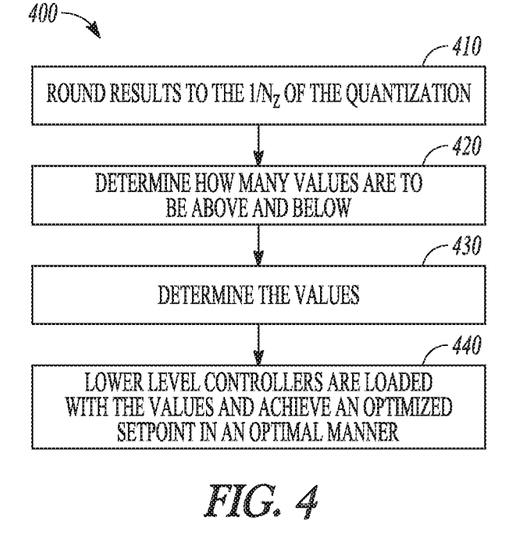
FIG. 4 is flowchart illustrating a heuristic approach to disaggregation according to an example embodiment.

FIG. 4 illustrates a method 400 of a heuristic approach to disaggregation in flowchart form. At 410, the result is rounded to the $1/N_z$ of the quantization. At 420, the method determines how many values are to be above and below, and at 430 the values are determined. Lower level controllers are then loaded with the values at 440 and achieve an optimized setpoint in an optimal manner. For some special cases with significantly different comfort ranges in different zones, this heuristic approach might be not applicable and the optimization based method 300 is used.

Figure 5:
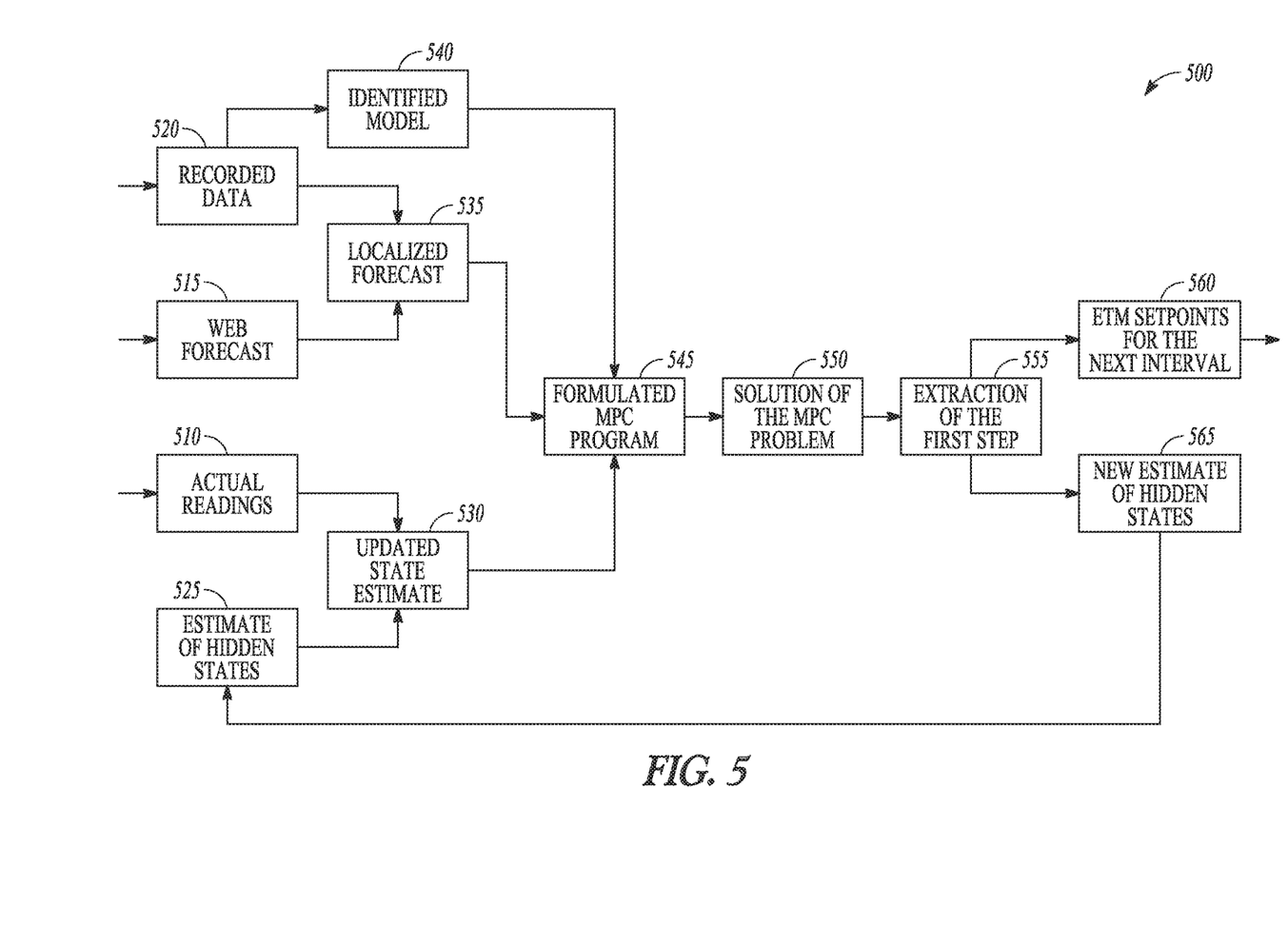
FIG. 5 is block diagram illustrating a block flow of functions performed by a system for precooling of a building according to an example embodiment.

FIG. 5 is a block diagram illustrating a block flow performed by a system generally at 500. Several input blocks are illustrated, including actual readings 510, web based weather forecast 515, recorded data 520, and an estimate of hidden states 525. The actual readings 510 and estimate of hidden states are combined to provide an updated state estimate at 530. The web forecast 515 and recorded data 520 are also combined to provide a localized forecast at 535. An identified model 540 is also generated from recorded data 520.

The updated state estimate 530, localized forecast 535, and identified model 540 are used to formulate the MPC problem at 545. The solution of the MPC problem is illustrated at 550, followed by extraction of the first step at 555. Setpoints for the next interval are then identified at 560, and a new estimate of hidden states is generated at 565 and provided to the estimate of hidden states block 525 for the next time period (e.g. one hour). This block flow 500 optimizes heating, ventilation, and air conditioning by running the HVAC devices at the most economical time. The model predictive control (MPC) approach may be utilized for such optimization.

Figure 6:
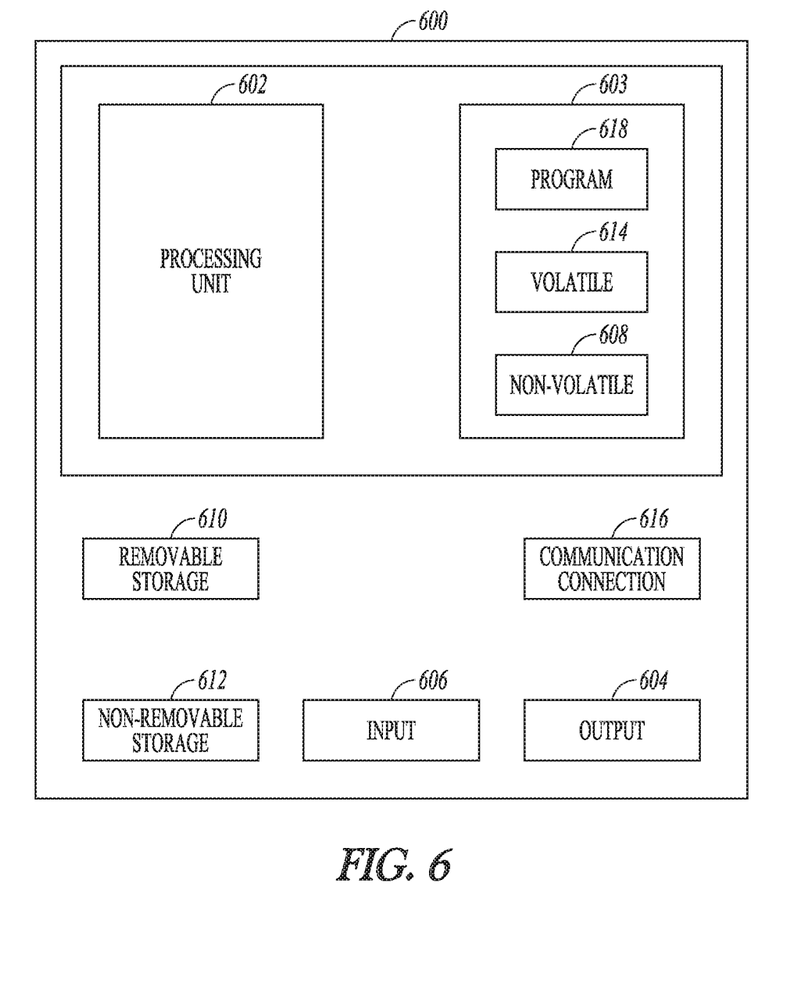
FIG. 6 is a block diagram of a system for implementing one or more methods according to example embodiments.

FIG. 6 is a block schematic diagram of a computer system 600 to implement one or more methods, simulators, MPC algorithms and controllers according to example embodiments. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 600, may include a processing unit 602, memory 603, removable storage 610, and non-removable storage 612. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. A method comprising:
aggregating multiple zones of an indoor structure via a processor, each zone having associated comfort limits;
formulating an aggregated single zone model predictive control (MPC) problem via the processor representative of the multiple zones for a heating ventilation and air conditioning (HVAC) system;
determining, via the processor, optimal aggregated actions as a function of the aggregated single zone model predictive control problem;
simulating, via the processor, an optimal trajectory of indoor qualities; and
determining, via the processor, zone temperature setpoints to comply with the comfort limits for each zone and pre-cool the indoor structure.

2. The method of example 1 wherein determining the zone temperature setpoints is performed to minimize temperature differences in selected zones.

3. The method of any of examples 1-2 wherein determining the zone temperature setpoints is performed to minimize changes of setpoints for a zone from a previous time instant.

4. The method of any of examples 1-3 wherein determining the zone temperature setpoints is performed to determine setpoints that have integer values.

5. The method of any of examples 1-3 wherein zones are weighted for aggregation.

6. The method of example 5 wherein weights for each zone are a function of area, volume, or other physical properties of the zone.

7. The method of example 5 wherein weights for each zone are determined using an identification procedure.

7. The method of any of examples 1-6 wherein determining zone temperature setpoints comprises disaggregating the aggregated actions.

8. The method of any of examples 1-7 and further comprising distributing the setpoints to lower level controllers of the HVAC system.

9. The method of any of examples 1-8 wherein determining optimal aggregated actions is performed by solving the MPC problem.

10. The method of any of examples 1-9 wherein the MPC problem utilizes weather predictions, dynamic prices, thermal capacity, and occupancy.

11. A machine readable storage device having instructions for execution by a processor of the machine to perform:

aggregating multiple zones of an indoor structure, each zone having associated comfort limits;
formulating an aggregated single zone model predictive control (MPC) problem representative of the multiple zones for a heating ventilation and air conditioning (HVAC) system;
determining optimal aggregated actions as a function of the aggregated single zone model predictive control problem;
simulating an optimal trajectory of indoor qualities; and
determining zone temperature setpoints to comply with the comfort limits for each zone and pre-cool the indoor structure.

12. The machine readable storage device of example 11 wherein determining the zone temperature setpoints is performed to minimize temperature differences in selected zones.

13. The machine readable storage device of any of examples 11-12 wherein determining the zone temperature setpoints is performed to minimize changes of setpoints for a zone from a previous time instant.

14. The machine readable storage device of any of examples 11-13 wherein zones are weighted for aggregation.

15. The machine readable storage device of example 14 wherein weights for each zone are a function of area of the zone or wherein weights for each zone are determined using an identification procedure.

16. The machine readable storage device of any of examples 11-15 wherein determining zone temperature setpoints comprises disaggregating the aggregated actions and further comprising distributing the setpoints to lower level controllers of the HVAC system.

17. The machine readable storage device of any of examples 11-16 wherein determining optimal aggregated actions is performed by solving the MPC problem.

18. The machine readable storage device of any of examples 11-17 wherein the MPC problem utilizes weather predictions, dynamic prices, thermal capacity, and occupancy.

19. A device comprising:
a processor; and
a memory device coupled to the processor and having a program stored thereon for execution by the processor to:
aggregate multiple zones of an indoor structure, each zone having associated comfort limits;
formulate an aggregated single zone model predictive control (MPC) problem representative of the multiple zones for a heating ventilation and air conditioning (HVAC) system;
determine optimal aggregated actions as a function of the aggregated single zone model predictive control problem;
simulate an optimal trajectory of indoor qualities; and
determine zone temperature setpoints to comply with the comfort limits for each zone and pre-cool the indoor structure.

20. The device of example 19 wherein determining zone temperature setpoints comprises disaggregating the aggregated actions, wherein determining optimal aggregated actions is performed by solving the MPC problem, and further comprising distributing the setpoints to lower level controllers of the HVAC system.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computing device for conditioning a structure, comprising:
a processor; and
a memory coupled to the processor and having a program stored thereon for execution by the processor to:
receive an updated state estimate, a localized forecast, and an identified model;
formulate an aggregated single zone model predictive control problem representative of multiple zones of the structure for a heating, ventilation, and air conditioning (HVAC) system using the updated state estimate, the localized forecast, and the identified model;
solve the model predictive control problem by determining aggregated actions as a function of the model predictive control problem; and
identify zone temperature setpoints for a next interval of the HVAC system by disaggregating the aggregated actions and
send the identified zone temperature setpoints to the HVAC system such that the HVAC system conditions the structure in accordance with the identified zone temperature setpoints.

2. The computing device of claim 1, wherein the program is stored on the memory for execution by the processor to:
receive actual readings and an estimate of hidden states; and
generate the updated state estimate by combining the actual readings and the estimate of hidden states.

3. The computing device of claim 1, wherein the program is stored on the memory for execution by the processor to:
receive a web forecast and recorded data; and
generate the localized forecast by combining the web forecast and the recorded data.

4. The computing device of claim 1, wherein the program is stored on the memory for execution by the processor to generate the identified model from recorded data.

5. The computing device of claim 1, wherein the program is stored on the memory for execution by the processor to generate a new estimate of hidden states from the solution of the model predictive control problem.

6. The computing device of claim 5, wherein the program is stored on the memory for executing by the processor to provide the new estimate of hidden states to the updated state estimate.

7. The computing device of claim 1, wherein the identified setpoints for the next interval of the HVAC system run HVAC devices of the HVAC system at a most economical time.

8. The computing device of claim 1, wherein the program is stored on the memory for executing by the processor to extract a first step from the model predictive control problem solution.

9. A machine readable storage device, having instructions for execution by a processor of the machine to perform:
formulating an aggregated single zone model predictive control problem representative of multiple zones of a structure for a heating, ventilation, and air conditioning (HVAC) system for the structure;
determining aggregated actions as a function of the aggregated single zone model predictive control problem;

identifying zone temperature setpoints for the HVAC system by disaggregating the aggregated actions; and
precooling the structure using the identified zone temperature setpoints.

10. The machine readable storage device of claim 9, wherein disaggregating the aggregated actions includes disaggregating the aggregated actions using a combination of heuristics and systematic search.

11. The machine readable storage device of claim 9, wherein disaggregating the aggregated actions includes minimizing a difference between the disaggregated actions and the aggregated actions.

12. The machine readable storage device of claim 11, wherein minimizing the difference between the disaggregated actions and the aggregated actions includes minimizing a range between a highest and a lowest disaggregated value.

13. The machine readable storage device of claim 12, wherein minimizing the range between the highest and the lowest disaggregated value includes minimizing changes against previous values.

14. The machine readable storage device of claim 13, wherein the previous values include inputs from external sources.

15. The machine readable storage device of claim 14, wherein the external sources include weather sources.

16. The machine readable storage device of claim 14, wherein the external sources include internal states of equipment of the HVAC system.

17. A method for precooling a structure, comprising:
aggregating multiple zones of a structure, each zone having associated comfort limits;
formulating an aggregated single zone model predictive control problem representative of the multiple zones for a heating, ventilation, and air conditioning (HVAC) system for the structure;
determining aggregated actions as a function of the aggregated single zone model predictive control problem;
identifying zone temperature setpoints for the HVAC system by disaggregating the aggregated actions using a heuristic approach; and
precooling the structure using the identified zone temperature setpoints.

18. The method of claim 17, wherein the heuristic approach includes rounding the aggregated actions.

19. The method of claim 17, wherein the heuristic approach includes determining how many of the zone temperature setpoints to be identified are above and below the comfort limits associated with the multiple zones.

20. The method of claim 19, wherein the method includes loading lower level controllers with a determined value of zone temperature setpoints above the comfort limits associated with the multiple zones and a determined value of zone temperature setpoints below the comfort limits associated with the multiple zones.

* * * * *